Patented May 22, 1951

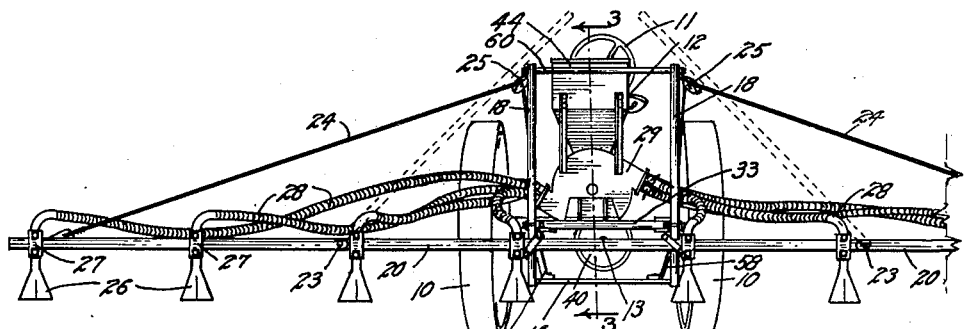

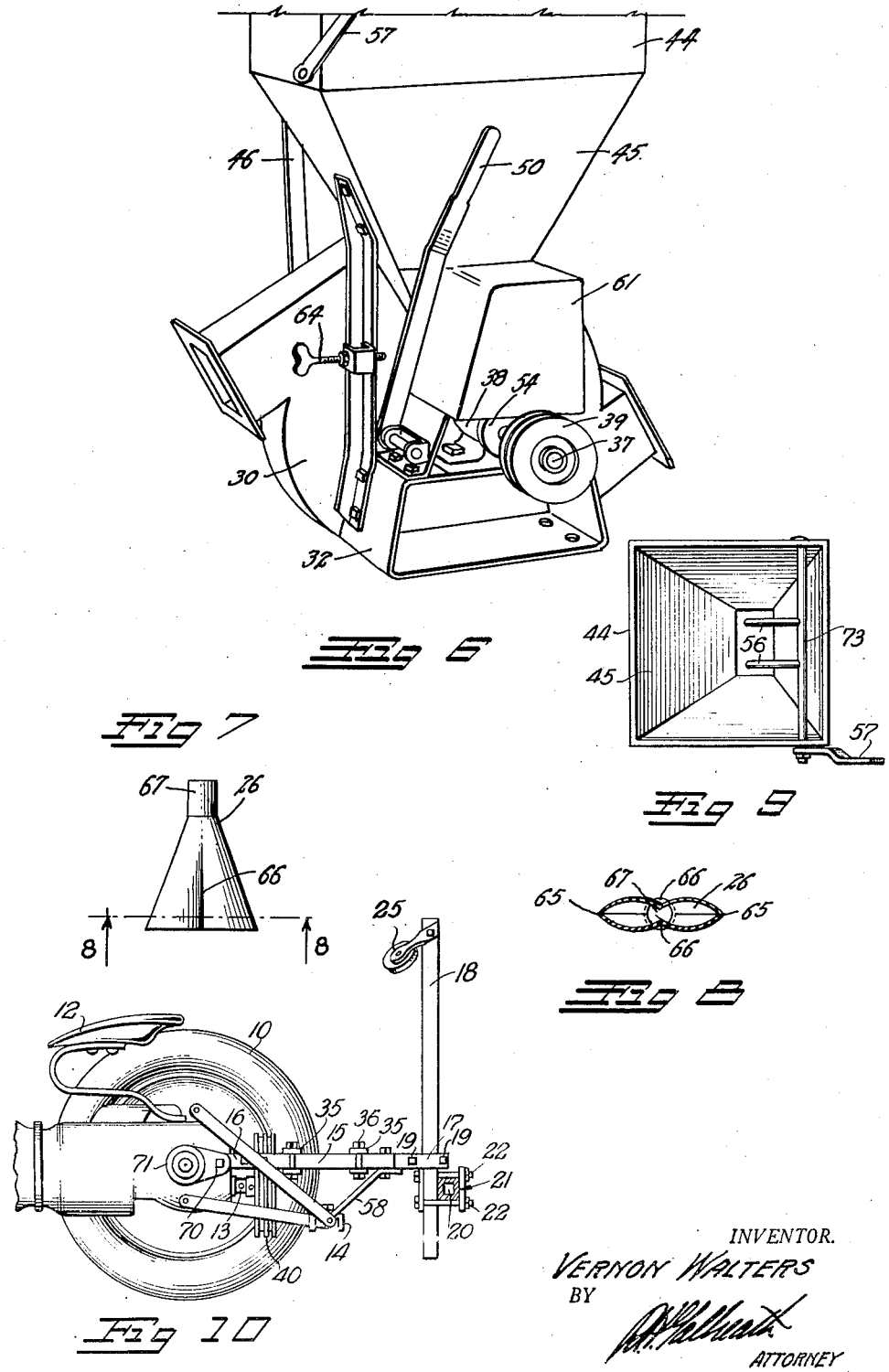

2,554,432

UNITED STATES PATENT OFFICE 2,554,432

PLANT DUSTING DEVICE

Vernon Walters, Denver, Colo., assignor to Howry-Berg, Inc., a corporation of Colorado Application June 26, 1944, Serial No. 542,222

1 Claim. (Cl. 43—148)

This invention relates to a plant dusting attachment for tractors and has for its principal object the provision of a simple, highly efficient device which can be quickly and easily attached to a tractor of any type; which will be adjustable so that the spray nozzles can be placed at any desired spacing or height over the plants; which will be adjustable to adapt it to the particular type of tractor upon which it is to be used; and which will employ the power take-off of the tractor for driving the operating mechanism.

Another object of the invention is to provide a feeding device for the powder which will feed the powder uniformly regardless of the amount of powder in the storage bin.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a rear perspective view of the improved plant dusting device, illustrating it in position on a typical tractor;

Fig. 2 is a perspective view of the powder storage and distributing portion of the device;

Fig. 3 is an enlarged vertical section taken on the line 3—3, Fig. 1;

Fig. 4 is a detail section through the powder distributor taken on the line 4—4, Fig. 3;

Fig. 5 is a detail perspective view of the agitator and powder feeding brush employed in the device;

Fig. 6 is a rear fragmentary perspective view of the blower portion of the improved dusting attachment;

Fig. 7 is an enlarged side view of the dusting nozzle employed in the invention;

Fig. 8 is an enlarged horizontal section through the dusting nozzle taken on the line 8—8, Fig. 7;

Fig. 9 is a detail top view of the powder storage bin of the improved attachment; and Fig. 10 is a detail view illustrating the manner of attaching the invention to a typical tractor.

In the drawing, parts of a typical tractor are designated by numerals as follows: ground engaging wheels 10, steering wheel 11, seat 12, power take-off shaft 13, draw bar 14, rear axle housing 71, and implement attachment ears 70.

The improved plant dusting attachment is supported on two longitudinal frame members 15 carrying tractor attachment plates 16 on their forward extremities. The plates 16 are provided with suitable bolt holes, as shown in Fig. 2, by means of which they may be bolted to a tractor in any desired manner. As illustrated in Fig. 10, the plates 16 are bolted to implement ears 70 on the rear axle housing 71. The rearward extremities of the longitudinal frame members 15 are supported by means of angle braces 58 extending to the tractor draw bar 14. Each frame member 15 terminates at its rear in two parallel clamping clips 17, between each pair of which a vertical standard 18 is clamped by means of clamp bolts 19. The standards 18 are held in spaced relation by means of a cross bar 60. A nozzle bar 20 is adjustably clamped to the vertical standards 18 by means of diagonal clamps 21 actuated by clamp bolts 22.

The nozzle bar preferably consists of three sections; a fixed middle section hinged at its extremities to two hinged sections upon suitable hinge bolts 23. This allows the hinged sections to be folded upwardly and inwardly as indicated in broken lines in Fig. 1 for transportation purposes. The extremities of the nozzle bar 20 are supported by means of flexible cables 24 extending from the two extremities of the bar upwardly and inwardly over sheaves 25, thence downwardly to any suitable connection on the tractor.

A plurality of powder distributing nozzles 26 are adjustably clamped to the bar 20 by means of suitable straps 27. The spacing of the straps 27 along the bar can be varied at will and the height of the nozzles above the plants can be adjusted by changing the position of the clamps 21 on the standards 18 or the position of the standards in the clips 17.

The powder is fed to the nozzles 26 through suitable flexible tubes 28 from a blower fan 29 housed in a suitable blower housing 30. The blower housing is supported between a base angle member 31 and a frame member 32. The latter two members rest upon cross-frame members 33 along which they are adjustable by means of adjusting bolts 34. The cross-frame members are adjustably mounted at their extremities on the longitudinal frame members 15 by means of suitable clamping ears 35 and bolts 36. This construction allows the blower housing to be adjusted toward or away from the tractor along the frame members 15 and toward either side of the center line of the tractor along the frame members 33. The adjustment of the blower housing toward or away from the tractor allows the blower housing to be moved to align it with the various positions of the power-take off shafts on differing types of tractors so that the attachment may be applied to any given tractor.

The fan 29 is mounted on a blower shaft 37 journalled in suitable bearings 38 mounted on the frame member 32. The shaft 37 terminates in a driven pulley 39. The pulley 39 is driven from a drive pulley 40, mounted on the power take-off shaft 13, by means of suitable transmission belts 41. The adjustability of the position of the blower housing allows the slack to be taken up in the belts for any type of tractor arrangement.

The blower housing discharges through a series of nipples 42, there being a series of nipples at each side of the housing. These nipples are connected to the flexible tubes 28 in any desired manner and each feeds one of the nozzles 26. Each nipple is provided with an individual control damper, the position of which may be set by means of a damper lever 43. Thus, the supply of air to the nozzles can be individually controlled to obtain uniform distribution and to close off any nozzles not desired. It will be noted that the nipples at one side of the blower housing take air from the top thereof while the nipples at the opposite side take the air from the bottom thereof.

The powder is stored in a storage bin 44 provided with a suitable lid 59 and having a hopper bottom 45. The bin is supported above the blower housing 30 upon suitable braces 46. The hopper bottom 45 terminates in a feed chamber 47 having a discharge opening 48 in its bottom. The size of the discharge opening is controled by means of a slide valve 49 operable from a valve lever 50. A powder chute 51 conveys the powder from the discharge opening 48 into the intake axis of the fan 29. The powder in the feed chamber 47 is constantly agitated by means of a rotating spider 52. The spider is mounted on a hub 63 fixed on the extremity of a feed shaft 62 extending from a standard speed reducer 53.

The speed reducer is driven through the medium of a suitable V-belt 54 from the blower shaft 37. Thus, whenever the blower shaft is operating, the spider 52 will be rotating to prevent packing of the material in the feed chamber 47. The speed reducer and the belt 54 are covered by a suitable cover plate 61.

A circular brush 55 is also mounted on the hub 63 so as to rotate therewith. The bristles of the brush member constantly sweep across the discharge opening 48 to sweep the powder therein. The powder falls in a uniform distributed stream into the intake of the blower from whence it will be blown to the powder nozzles 26.

Any packing which may occur in the hopper bottom 45 can be loosened by means of stirring rods 56 which project from a stirring shaft 73 extending across the bin 44 at one side thereof. The stirring shaft 73 terminates in an operating lever 57 on the exterior of the bin 44 as shown in Fig. 9.

It is desired to call attention to the ease with which the device may be attached to a standard tractor. It is only necessary to bolt the attachment bars 16 to the tractor chassis and the angle braces 58 to the draw bar 14. The belt 41 is then placed in position and the device is ready for operation. The device can be completely removed from the tractor by simply removing four attachment bolts and is readily adjustable for tractors of different height along the standards 18 and for various positions of tractor take-off shafts along the longitudinal frame members 15.

An adjustable stop screw 64 is provided in the back of the valve lever 50 to limit its opening movement. The operator sets the stop screw at the point to obtain the desired dust distribution and thereafter need only swing the lever 50 to its two extreme positions without further adjustment.

It is desired to call attention to the novel construction of the nozzles 26. These are formed from two substantially triangular pieces of sheet metal joined along their inclined edges as shown at 65 by means of crimping, welding, etc. The two sheets terminate at the top in a tubular sleeve 67 into which the flexible tubes 28 discharge. Each sheet is provided with a vertical indentation 66 at its middle so that in the assembled nozzles these indentations will form a restricted throat at the bottom of the nozzle.

The maximum discharge of dust will, of course, be vertically under the discharge of the tube 28. By placing a restricted throat at this point, this maximum discharge is broken up and spread to the two sides of the nozzle so as to cause a uniform discharge throughout the entire width of the open bottom thereof.

The indented sheet metal construction of the nozzle forms a convenient means for adjustment to obtain a uniform discharge for if it is found that too much dust is discharging at the middle portion, it is only necessary to squeeze the indentations 66 toward each other; and if too little is discharging at the middle, these indentations can be easily pried apart until the desired uniform distribution is obtained.

While the invention has been described as an attachment for tractors, it can, of course, be constructed as an independent unit on wheels of its own, if desired, without changing the principles of operation.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A plant dusting attachment for a tractor of the type having a horizontal, transversally-extending, draw bar across the rear thereof, and a rearwardly-extending power take-off shaft, comprising: two parallel, horizontal, longitudinally-extending frame members; attachment means on the forward extremity of each frame member arranged for attachment to a tractor; a supporting brace below each frame member extending forwardly and downwardly to said draw bar; a pair of parallel clamping clips extending from the rearward extremity of each frame member; a vertical standard positioned between each pair of clamping clips and extending upwardly and downwardly therefrom; a clamping bolt clamping each pair of clips to one of said standards; a horizontal nozzle bar extending across the downwardly-projecting portions of said standards; a pair of diagonally-positioned clamping strips extending across the points of intersection between each standard and said nozzle bar; a pair of clamp bolts drawing the clamping strips of each pair against the front and rear faces of the nozzle bar and standard, respectively, to lock said nozzle bar to said standards; two parallel, horizontal cross members extending between said frame members; a pair of parallel clamping ears projecting from each extremity of each cross member in vertical, spaced-apart relation, the upper ear of each pair extending over one of said frame members, the lower ear of each pair extending beneath one of said frame members; a clamping bolt clamping each pair of ears to one of said frame members; a blower supported on said cross members; means for securing said blower at any desired point along said cross members; means for feeding powder to said blower; powder-distributing nozzles; means for clamping said nozzles in spaced relation along said nozzle bar; flexible conduits connecting said nozzles to said blower; a belt pulley on siad blower; a second belt pulley on said power take-off shaft; and an endles belt extending around both pulleys for driving said blower, the clamping clips allowing the downward projection of the standards to be varied to suit given crops, the diagonally positioned strips allowing the position of the nozzle bar to be varied to accommodate various crops, said clamping ears allowing the forward and back positions of the blower to be adjusted to bring the two pulleys into alignment on various makes of tractors, and the means for securing the blower at any desired point along the cross members allowing the tension in the belt to be regulated to suit various tractors and various driving conditions.

VERNON WALTERS.

REFERENCES CITED

The following references are of record in the file of this patent:

UNITED STATES PATENTS

| Number | Name | Date |
|---|---|---|
| Re. 17,209 | Oechsle | Feb. 5, 1929 |
| 157,256 | Wiard | Nov. 24, 1874 |
| 392,289 | Roach | Nov. 6, 1888 |
| 959,819 | Towner | May 31, 1910 |
| 1,475,957 | Lemons | Dec. 4, 1923 |
| 1,515,336 | Brandt | Nov. 11, 1924 |
| 1,674,391 | Dunnagan | June 19, 1928 |
| 1,769,159 | Oechsle | July 1, 1930 |
| 2,040,845 | Heim | May 19, 1936 |
| 2,157,630 | Root | May 9, 1939 |
| 2,171,205 | Zinke | Aug. 29, 1939 |
| 2,242,722 | Henry | May 20, 1941 |
| 2,279,495 | Root | Apr. 14, 1942 |
| 2,425,419 | Carnes | Aug. 12, 1947 |

FOREIGN PATENTS

| Number | Country | Date |
|---|---|---|
| 472,197 | France | July 29, 1914 |